United States Patent
Hatasaki et al.

(10) Patent No.: US 9,069,465 B2
(45) Date of Patent: Jun. 30, 2015

(54) COMPUTER SYSTEM, MANAGEMENT METHOD OF COMPUTER RESOURCE AND PROGRAM

(75) Inventors: Keisuke Hatasaki, Kawasaki (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 241 days.

(21) Appl. No.: 13/383,760

(22) PCT Filed: Mar. 26, 2010

(86) PCT No.: PCT/JP2010/056045
§ 371 (c)(1),
(2), (4) Date: Mar. 21, 2012

(87) PCT Pub. No.: WO2011/070803
PCT Pub. Date: Jun. 16, 2011

(65) Prior Publication Data
US 2012/0179823 A1    Jul. 12, 2012

(30) Foreign Application Priority Data
Dec. 11, 2009 (JP) ................................ 2009-281911

(51) Int. Cl.
*G06F 9/50* (2006.01)
*G06F 3/06* (2006.01)
*G06F 9/46* (2006.01)

(52) U.S. Cl.
CPC . *G06F 3/06* (2013.01); *G06F 9/461* (2013.01)

(58) Field of Classification Search
USPC .......... 709/226; 726/2, 21, 36; 713/150, 163, 713/181; 380/255, 264, 276
See application file for complete search history.

(56) References Cited

U.S. PATENT DOCUMENTS

| | | | |
|---|---|---|---|
| 6,779,016 B1 | 8/2004 | Aziz et al. | |
| 2004/0054780 A1* | 3/2004 | Romero | 709/226 |
| 2005/0267895 A1* | 12/2005 | Yoshiuchi et al. | 707/10 |
| 2007/0180087 A1 | 8/2007 | Mizote et al. | |

FOREIGN PATENT DOCUMENTS

| | | |
|---|---|---|
| JP | 2003-507817 A | 2/2003 |
| JP | 2004-110791 | 4/2004 |
| JP | 2006-031400 A | 2/2006 |
| JP | 2007-164304 A | 6/2007 |
| WO | WO 01/14987 A2 | 3/2001 |

OTHER PUBLICATIONS

PCT International Search Report on application No. PCT/JP2010/056045 dated Jul. 6, 2010; 2 pages.
Japan Patent Office action on application 2014-114521 mailed Jan. 27, 2015; pp. 1-3.

* cited by examiner

*Primary Examiner* — Jason K. Gee
*Assistant Examiner* — Sharif E Ullah
(74) *Attorney, Agent, or Firm* — Foley & Lardner LLP

(57) ABSTRACT

Servers and a management server for managing a computer resource for a providing application constructed from storage connected to the servers receive an identifier of the application and a requested resource amount to assign to the application, refer to a application profile to identify the application and a system image corresponding to the identifier, and on the basis of the identifier, refer to a application usage history database and a application data table to acquire the number of times that the application has been used and the existence or non-existence of saved application data. If the usage is a reuse and there is saved application data, storage in which the application data has been saved is acquired from the application data table, and a combination of a server and storage which satisfies the requested resource amount and can access the application data is determined by referring to a resource table.

17 Claims, 12 Drawing Sheets

FIG. 4

APPLICATION USAGE HISTORY DB 31

| APPLICATION ID (311) | NUMBER OF USES (312) | LAST ALLOCATED RESOURCE (313) | |
|---|---|---|---|
| | | (314) | (315) |
| A | 1 | SERVER | SERVER 1 (IN USE) |
| | | NETWORK | NETWORK 1 (IN USE) |
| | | STORAGE | STORAGE 1 (IN USE) |
| B | 2 | SERVER | SERVER 2 |
| | | NETWORK | NETWORK 1 |
| | | STORAGE | STORAGE 1 |
| C | 0 | - | - |
| D | 1 | SERVER | .... |
| | | NETWORK | .... |
| | | STORAGE | .... |

FIG. 5

41 APPLICATION DATA TABLE

| APPLICATION ID (411) | STORED OR NOT (412) | STORED STORAGE (413) | USER ALLOWED TO ACCESS (414) |
|---|---|---|---|
| A | NOT STORED | - | - |
| B | STORED | STORAGE 1: LU2: STORAGE | USER B |
| C | STORED | STORAGE 2: LU1: ARCHIVE | USER C |
| D | STORED | STORAGE 3: LU1: BACKUP BY SOFTWARE | USER D |

FIG. 6

42 SERVER RESOURCE TABLE

| SERVER RESOURCE ID | SPECIFICATION | USE STATUS | CONNECTION DESTINATION |
|---|---|---|---|
| SERVER 1 | CPU:Core A 3GHz x 4<br>MEMORY : 16GB<br>I/O : NICx2 HBAx2 | IN USE | NETWORK1<br>STORAGE2 |
| SERVER 2 | CPU:Core A 3GHz x 2<br>MEMORY : 16GB<br>I/O : NICx2 HBAx2 | UNUSED | NETWORK1<br>STORAGE2 |
| SERVER 3 | CPU:Core A 3GHz x 4<br>MEMORY : 16GB<br>I/O : NICx2 HBAx2 | UNUSED | NETWORK1<br>STORAGE2 |
| SERVER 4 | CPU:Core A 3GHz x 4<br>MEMORY : 16GB<br>I/O : NICx2 HBAx2 | VIRTUALIZED ENVIRONMENT AVAILABLE :<br>    CPU : 4Ghz<br>    MEMORY : 4GB | NETWORK1<br>STORAGE2 |
| .... | .... | .... | .... |

FIG. 7

43  STORAGE RESOURCE TABLE

| STORAGE RESOURCE ID | LOGICAL VOLUME INFORMATION | UNALLOCATED CAPACITY |
|---|---|---|
| STORAGE 1 | LU1 : 120GB<br>LU2 : 120GB<br>LU3 : 80GB | 200GB |
| STORAGE 2 | LU1 : 80GB<br>LU2 : 200GB | 150GB |
| STORAGE 3 | LU1 : 1000GB<br>LU2 : 1000GB | 20GB |
| STORAGE 4 (ARCHIVE) | LU1 : 10000GB | 0GB |
| .... | .... | .... |

COMPUTER SYSTEM, MANAGEMENT METHOD OF COMPUTER RESOURCE AND PROGRAM

CROSS-REFERENCE TO RELATED PATENT APPLICATIONS

This application is the US national phase application of PCT Application PCT/JP2010/056045 filed Mar. 26, 2010 and claims priority from Japan Priority Application 2009-281911 filed Dec. 11, 2009. All of the aforesaid applications are incorporated herein by reference in their entirety as if fully set forth herein.

BACKGROUND OF THE INVENTION

This invention relates to a computer system, and more particularly, to a method of managing a configuration of a computer resource.

In recent years, an increasing number of data centers and the like are using a resource pool in which a server virtualization technology is combined with a storage area network (SAN) and a network, and in which a computer resource, a storage resource, and a network resource are dynamically allocated.

Also gaining popularity is provisioning which uses the resource pool to dynamically allocate system resources (computer resource+storage resource+network resource) based on a middle- to long-term projection of an application and the like, to thereby suppress excess investment on IT systems in advance and make effective use of the limited system resources.

In the operation of the resource pool, after a resource satisfying required specifications of an application is allocated to the application from shared resources (system resources), when a usage period of the application expires, the resource may be released from the application of interest to allow another application to reuse the same resource (for example, Japanese Patent Application Laid-open No. 2004-110971). This operation provides an advantage that effective usage of the resources may be realized by sharing and reusing the resources.

SUMMARY

In the conventional operation of the resource pool described above, application data generated and used when a resource is used is stored in a storage system in the resource allocated to the application. Thereafter, when the resource of the application of interest is released, the stored application data needs to be deleted in order to allow the resource to be used for another application.

However, in the above-mentioned operation of the resource pool, there may be a case where, after a resource is release from an application, the same application is reused again (and hence the resource is reallocated). An example is a case where a resource is used for development and the resource is reallocated for the production environment.

In that case, for reusing the application data, there is a need to perform an operation in which the application data is always backed up before releasing the resource and the application data is restored at the time of reuse. Therefore, there has been a problem in that a user needs to go through the trouble of performing the above-mentioned operation in releasing the resource.

It is an object of this invention to provide a provisioning method which eliminates the trouble in reusing application data in the operation of a resource pool.

According to this invention, there is provided a management method, in which a computer resource including one or more servers and a storage coupled to the one or more servers, for providing an application, and a management server including a processor and a memory, for managing the computer resource are provided, and in which the management server allocates the computer resource to the application, the management server including: an application profile for holding an identifier of the application and a system image corresponding to the identifier of the application; an application usage history database for holding in association with the identifier of the application, a number of uses of the application, a server used by the application, and the storage used by the application; an application data table for holding, in association with the identifier of the application, whether application data used in the application is stored or not, and a location of the storage in which the application data is stored; and a resource table for holding performance information of the one or more servers and the storage constituting the computer resource, a use status, and a connection relationship, the management method including: receiving, by the management server, the identifier of the application, a required amount of resource including an amount of resource to be allocated to the application as a request to allocate the computer resource; referring, by the management server, to the application profile to identify the application and the system image corresponding to the identifier; referring, by the management server, to the application usage history database and the application data table based on the identifier of the application, to acquire a number of uses of the application and whether the application data is stored or not; determining, by the management server, when the use of the application is a first time or when the application data is not stored, determining a server and a storage to be allocated to the application based on the required amount of resource and the resource table; acquiring, by the management server, when the use of the application is reuse and when the application data is stored, the storage in which the application data is stored from the application data table and determining a combination of a server and a storage which satisfy the required amount of resource and are accessible to the application data by referring to the resource table; and allocating, by the management server, the system image to the determined server.

According to this invention, in the operation of the resource pool, it is possible to facilitate the operation of reusing the application data of the application system once used by the user.

BRIEF DESCRIPTION OF THE DRAWINGS

FIG. 4 illustrates an example of the application usage history DB.

FIG. 5 illustrates an example of the application data table.

FIG. 6 illustrates an example of the server resource table.

FIG. 7 illustrates an example of the storage resource table.

DETAILED DESCRIPTION OF THE PREFERRED EMBODIMENT

Hereinafter, an embodiment of this invention is described with reference to the accompanying drawings.

Figure 1:
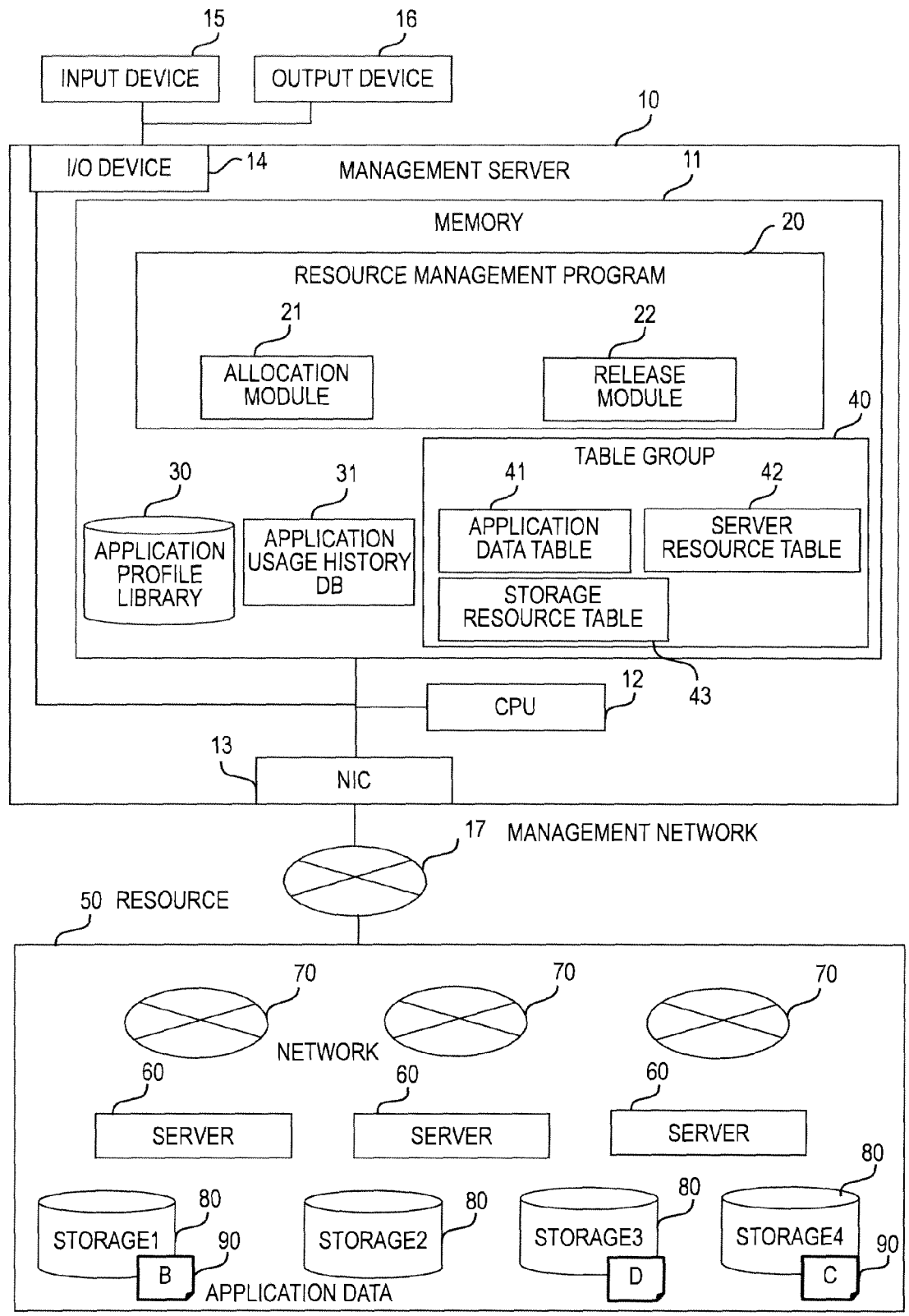
FIG. 1 is a block diagram illustrating a configuration of a computer system according to the embodiment of this invention.

FIG. 1 is a block diagram illustrating a configuration of a computer system according to the embodiment of this invention. The computer system of this embodiment mainly includes a resource 50 including a plurality of servers 60 and the like, and a management server 10 for managing the resource 50.

The management server 10 mainly includes a CPU 12 for performing arithmetic operation, a memory 11 for storing a program and data, a network interface card (NIC) 13 for communicating to/from a management network 17, and an I/O device 14, and holds a resource management program 20, an application profile library 30, an application usage history DB 31, and a table group 40 in the memory 11.

The management server 10 includes an auxiliary storage system such as hard disk drives or a flash memory or is coupled to an external storage system via an I/O interface 14, and the application profile library 30 and the application usage history DB 31 may hold the table group 40 in the auxiliary storage system or the storage system. It should be noted that the auxiliary storage system and the external storage system function as computer-readable non-transitory data storage medium for storing the resource management program 20.

An input device 15, which is a mouse, a keyboard, or the like, and an output device 16, which is a display or the like, are used to input/output information between the management server 10 and a user. The input device 15 and the output device 16 are coupled to the CPU 12 via the I/O device 14.

The resource management program 20, which manages the resource 50 via the management network 17, includes subprograms of an allocation module 21 and a release module 22. It should be noted that in this embodiment, the resource management program 20 is described as a program to be executed by the CPU 12, but may be implemented by hardware, firmware, or a combination thereof installed in the management server 10.

The table group 40 used by the resource management program 20 includes an application data table 41 holding information for managing application data 90 in the resource 50, a server resource table 42 holding a list of the server resources 60, among others, in the resource 50, and a storage resource table 43 holding a list of storages 80, among others, in the resource 50. It should be noted that the table group 40 may also include a network resource table including a list of networks 70, among others, in the resource 50 and performance of each of the networks, a connection destination network, and a use status, which is omitted in this embodiment.

The resource 50 comprises resources including the plurality of servers 60, the plurality of networks 70, and the plurality of storages 80, and the application data 90 stored in the storages 80. As used herein, the application data 90 means data output, or referred to, by an application program of an application run in the resource 50. It should be noted that the servers 60, the networks 70, the storages 80 indicate physical server, network devices (such as network switches), and storage systems (such as storage array), respectively. It should be noted that the servers 60 may be virtual servers obtained by virtualizing the physical servers by using a virtualization technology.

Figure 2:
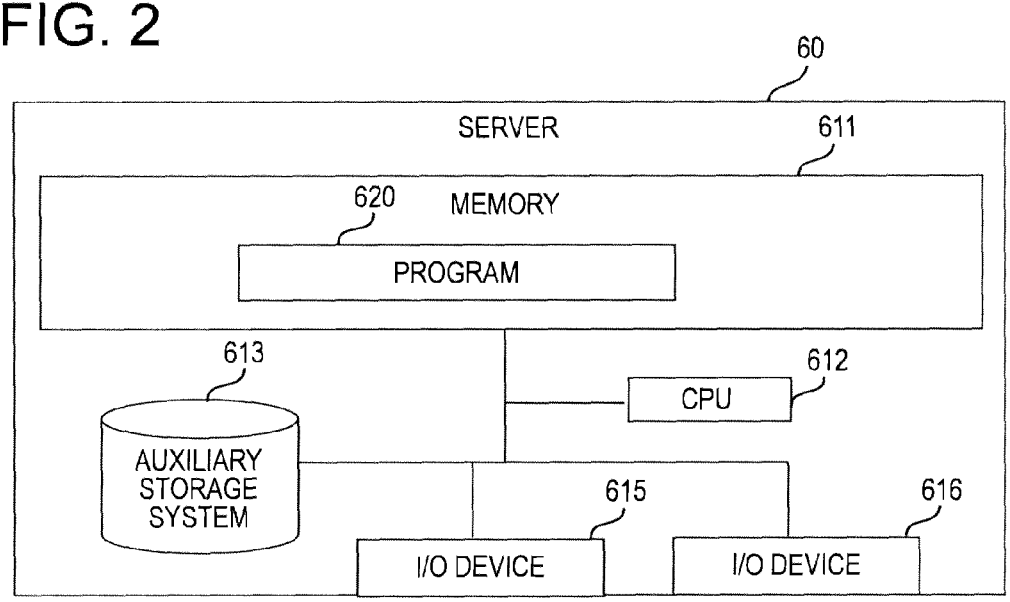
FIG. 2 is a block diagram illustrating a configuration of a server.

FIG. 2 is a block diagram illustrating a configuration of the server 60. The server 60 includes a memory 611, a CPU 612, an auxiliary storage system 613 such as a hard disk drive or a flash memory, and one or more I/O devices 615 and 616. It should be noted that the auxiliary storage system 613 is not always necessary. In this example, the I/O devices 615 and 616 are, for example, NICs or host bus adaptors (HBAs). The memory 611 may hold a program 620, and the program 620 is executed by the CPU 612. It should be noted that as described below, the program 620 provides an application, and is loaded from the storage 80 to the memory 611.

Figure 3:
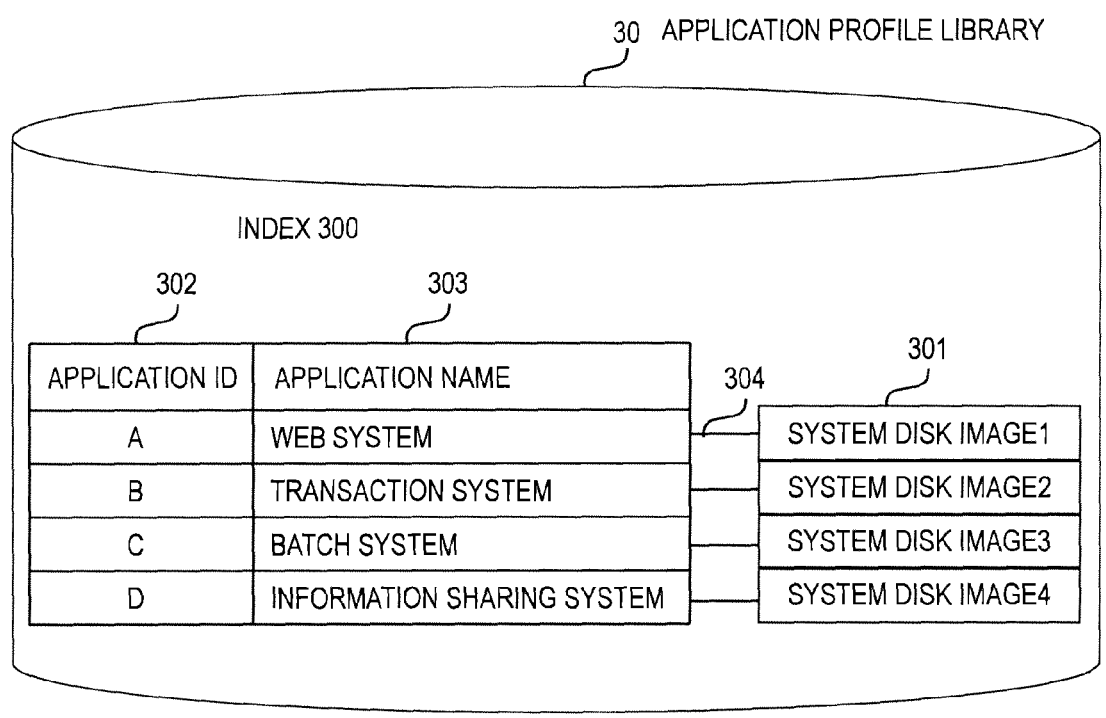
FIG. 3 is an explanatory diagram illustrating an example of the application profile library.

FIG. 3 is an explanatory diagram illustrating an example of the application profile library 30 used by the resource management program 20. The application profile library 30 comprises an index 300 and system disk images 301. The index 300 holds a list of application profiles of applications run in the resource 50, and holds in a column 302 an application ID as an identifier for uniquely identifying the application of interest. The index 300 also holds in a column 303 an application name of the application of interest, and further holds a correspondence relationship 304 of the application of interest with respect to the system disk image. It should be noted that the system disk image 301 may hold, not only binary data to be stored in the application system disk, but also information on definition information (CPU, memory capacity, coupled network, disk capacity, and coupled storage) of the virtual servers used for server virtualization and the like. Examples of the system disk image may include Open Virtualization Format (OVF). Alternatively, the correspondence relationship 304 may be described as a path to the storage 80 or the like. It should be noted that one application profile may hold system information including information on one or more servers, network connection configuration, and storage connection configuration used by the application of interest. In this case, one application ID (column 302) may be associated with one or more system disk images (column 301).

FIG. 4 illustrates an example of the application usage history DB 31 used by the resource management program 20. Information stored in this application usage history DB 31 includes information of columns 311 to 313. The column 311 is an application ID and corresponds to the column 302 of the application profile library 30. The application usage history DB 31 holds in the column 312 the number of times the application of interest is run on the resource 50. The application usage history DB 31 holds in the column 313 information on the resources of the server, the network, and the storage in the resource 50 that are most recently used by the application of interest. In regard to information in a column 315, the application usage history DB 31 holds in a column 314 classification of the resources, and holds in the column 315 identifiers (or identification names) of the server 60, the network 70, and the storage 80 used by the application of interest in accordance with the classification of the resources. It should be noted that when the resource is currently allocated to the application of interest, an "(in use)" flag is set to the column 315, and the column 315 is blank otherwise. It should be noted that with respect to one application, a plurality of servers, networks, and storages may be allocated. In this case, a plurality of identifiers are described in the column 315.

FIG. 5 illustrates an example of the application data table 41 used by the resource management program 20. The application data table 41 holds a storage status of the application data 90 used in an application. A column 411 is an application ID and corresponds to the column 302 of the application profile library 30. A column 412 shows the storage status of the application data 90. The column 412 shows "stored" when the application data 90 is stored, and shows "not stored" when the application data 90 is not stored. A column 413 stores information on the storage 80 in which the application data 90 is stored. It should be noted that the figure shows the identifier of the storage 80, an identifier of a logical unit (LU), and a storage method of the storage destination as, for example, "Storage 1: LU2: storage". It should be noted that when the storage method is "storage", the application data 90 is directly stored in the logical unit of the storage. In addition, when the storage method is "archive", it indicates that the application data 90 is stored in an archive storage. Further, when the storage method is "backup by software", it indicates that the application data 90 is stored as backup data using backup software. A column 414 shows an identifier of a user who is allowed to access the application data 90. The column 414 indicates that users other than the user who requested the resources cannot access the application data 90.

FIG. 6 illustrates an example of the server resource table 42 used by the resource management program 20. A column 421 shows an identifier of the server resource. A column 422 shows specifications (amount of resource and performance information) of the server resource. A column 423 shows a use status of the server resource. The column 423 shows "in use" when the server resource is currently used, and shows "unused" when the server resource is not used yet. It should be noted that when the server virtualization function is running on the server resource, the column shows "virtualization environment" and stores the amount of resource of the CPU and the memory that are not consumed by the virtual server, which is an available amount of resource, as "available:", "CPU: 4 Ghz", an "memory: 4 GB", for example. A column 424 indicates resources of the network 70 and the storage 80 to which the server resource can be coupled.

Figure 15:
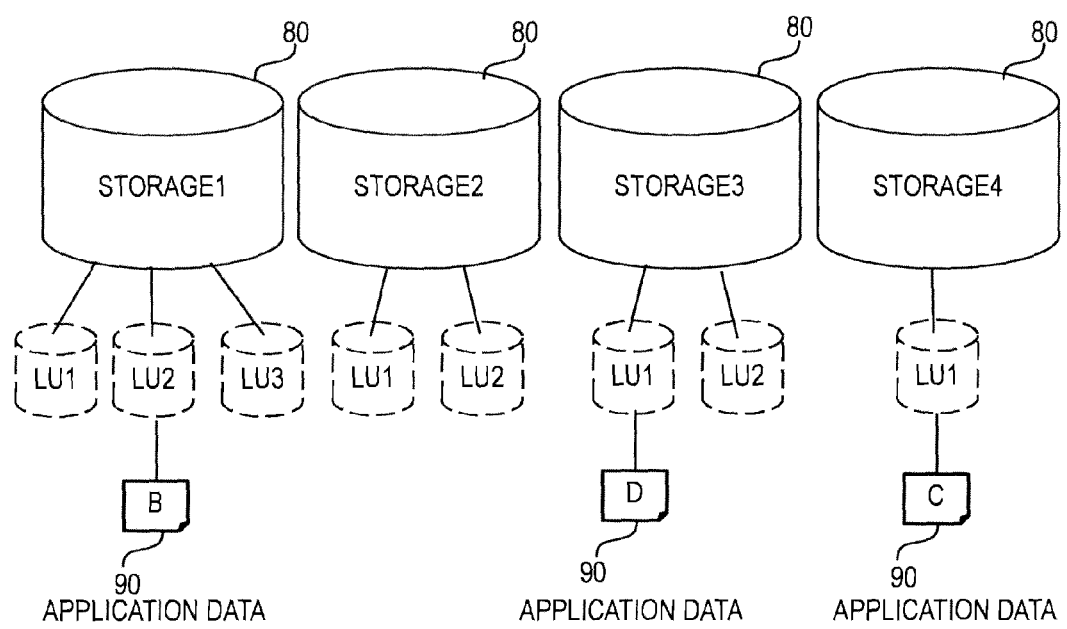
FIG. 15 is a block diagram illustrating a relationship between the storages and the logical units.

FIG. 7 illustrates an example of the storage resource table 43 used by the resource management program 20. A column 431 shows an identifier of a storage resource. A column 432 stores a list of combinations of the logical units and capacities thereof held by the storage resource as, for example, "LU1: 120 GB". A column 433 shows an unused storage capacity of the storage resource that is not yet allocated to the logical unit. The relationship between the storages 80 and the logical units in the storage resource table 43 illustrated in FIG. 7 is as illustrated in FIG. 15. FIG. 15 is a block diagram illustrating a relationship between the storages 80 and the logical units.

Figure 8:
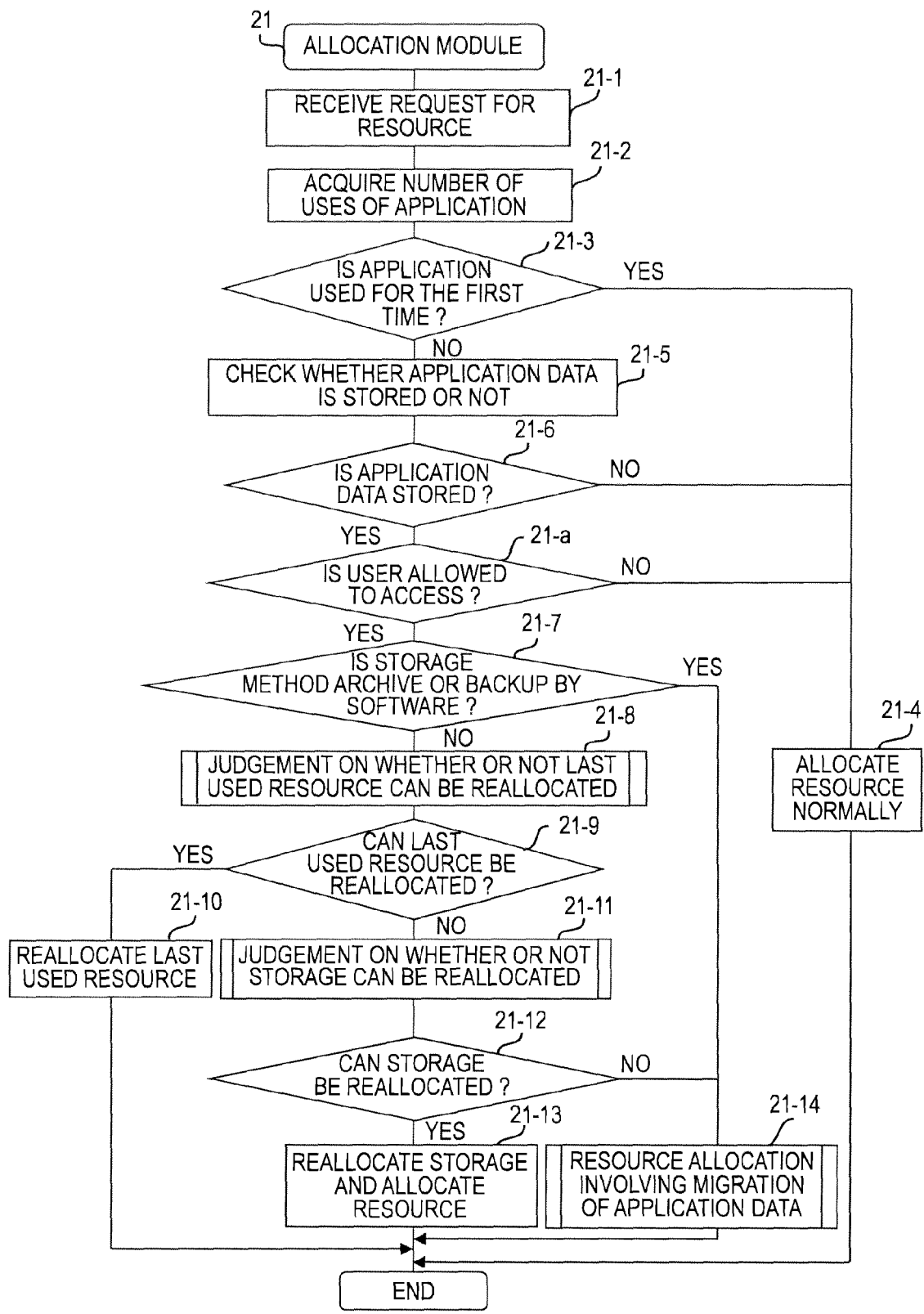
FIG. 8 is a detailed flow chart of the allocation module.

FIG. 8 is a detailed flow chart of the allocation module 21 of the resource management program 20. It should be noted that the allocation module 21 is invoked when the user wants to allocate resources to an application. In addition, the user (or administrator) may provide instructions from the input device 15 of the management server 10 or a computer (not shown) to the resource management program 20.

In Step 21-1, the user makes a resource allocation request by specifying an application profile (application ID) and a required amount of resource (CPU frequency and the number of CPUs, memory capacity, network performance and the number of networks, and storage capacity) so as to request the resource management program 20 running on the management server 10 to allocate the resources to the application. The resource management program 20 receives this request. It should be noted that at this time, the user specifies whether or not to reuse the application data 90. Hereinafter, the application of the application profile selected at this point is referred to as "application of interest". In this step, the identifier of the user who requested the resources is also received.

In Step 21-2, the management server 10 acquires the number of uses of the application of interest. For this purpose, the number of uses (column 312) of the application usage history DB 31 is referred for the usage history corresponding to the application ID of the application of interest.

In Step 21-3, the management server 10 judges whether or not the application of interest is used for the first time. The application of interest is used for the first time when the number of uses of the application of interest is 0, and the processing proceeds to Step 21-4. When the application of interest is not used for the first time, the processing proceeds to Step 21-5. It should be noted that in Step 21-1, when the application data 90 does not need to be reused, the processing proceeds to Step 21-4 even when the application of interest is not used for the first time.

In Step 21-4, normal allocation of the resources is performed by referring to the server resource table 42 and the storage resource table 43 based on the required amount of resource (acquired in Step 21-1) for the application of interest to determine the server 60 and the storage 80 in the resource 50 that satisfy the required amount of resource, provisioning the application of interest, and incrementing the "number of uses" of the column 312 of the application usage history DB 31 by (+1). Further, the management server 10 adds the resource to the column 313 of the application usage history DB 31, and sets a flag indicating that the resource is currently used. At this time, when a resource that satisfies the required amount of resource cannot be found, the management server 10 displays a message indicating a resource shortage on the output device 16. It should be noted that the provisioning as used herein means establishing connection (access allowance) among the server 60, the network 70, and the storage resource 80 for running the application of interest, and deploying the system disk images 301 and allocating data disks (logical units) to the resources based on the contents of the application profile of the application of interest, to thereby allow the application program of the application of interest to be invoked. It should be noted that when the application profile includes the definition of the virtual servers, the virtual servers are also created. Alternatively, when the application profile is associated with a plurality of servers, a plurality of storages, or a plurality of networks, the plurality of servers, the plurality of storages, or the plurality of networks may be provisioned.

Next, in Step 21-5, the management server 10 acquires information on whether the application data 90 is stored or not. In this example, the management server 10 refers to the column 412 of the application data table 41. In Step 21-6, the processing proceeds to Step 21-a when the application data 90 is stored, or proceeds to Step 21-4 otherwise.

In Step 21-a, when the identifier of the user who made the resource request received in Step 21-1 and any of one or more user identifiers corresponding to the application data 90 in the column 414 of the application data table 41 match, the processing proceeds to Step 21-7. Otherwise, the processing proceeds to Step 21-4. In this manner, the storage 80 of the application data 90 can be allocated only to the user who is allowed to access the application data 90.

In Step 21-7, the management server 10 judges if the storage method of the application data 90 of the application of interest is archive or backup by software. For this purpose, the column 413 of the application data table 41 is referred to. It should be noted that the processing proceeds to Step 21-14 when the storage method is archive or backup by software, or proceeds to Step 21-8 otherwise.

In Step 21-8, it is judged whether or not the resources that are most recently used by the application of interest (in this example, last used resources) can be reallocated. Details of the judgment are described below with reference to FIG. 10.

In Step 21-9, as the result of Step 21-8, the processing proceeds to Step 21-10 when the last used resources can be reallocated, or proceeds to Step 21-11 otherwise. In Step 21-10, the management server 10 reallocates the last used resources. In this example, the management server 10 acquires the last allocated resources stored in the column 313 of the application usage history DB 31 and determines the resources of the server 60, the network 70, and the storage 80 to be allocated, provisions the application of interest, increments the "number of uses" in the column 312 of the application usage history DB 31 by (+1), and sets a flag indicating that the resource is currently used in the column 313. It should be noted that the provisioning causes the determined server 60 to execute the system disk images 301, and the determined storage 80 starts the application using the application data 90.

In Step 21-11, the management server 10 judges whether or not the resource of the storage 80 in which the application data 90 of the application of interest is stored can be reallocated. Details of the judgment are described below with reference to FIG. 11.

In Step 21-12, the processing proceeds to Step 21-13 when the result of Step 21-11 is that the resource of the storage in which the application data 90 of the application of interest is stored can be reallocated, or proceeds to Step 21-14 otherwise.

In Step 21-13, the management server 10 determines for the application of interest the storage 80 in which the application data 90 is stored as a storage resource to be allocated to the application of interest, and refers to the server resource table 42 based on the required amount of resource (acquired in Step 21-1) for the application of interest to determine the server 60 of the resource 50 that satisfies the required amount of resource. Then, the management server 10 provisions the application of interest, increments the "number of uses" in the column 312 of the application usage history DB 31 by (+1), adds the identifier of the resource in the column 313, and sets a flag indicating that the resource is currently used in the column 315. In Step 21-14, the management server 10 performs resource allocation processing involving migration processing of the application data 90. Details of the resource allocation processing are described below with reference to FIG. 12.

Through the above-mentioned processing, the management server 10 stores the application ID and the application configuration (such as software configuration) in the application profile library 30, and stores the number of uses and the resources used in the application usage history DB 31 as the usage history of the application of interest corresponding to the application ID. When the management program of the management server 10 allocates a resource based on the application profile and releases the resource, and then uses the application of the same application ID again, the management program may select and allocate, from the application usage history corresponding to the application ID, a resource that can be allocated to the application data 90 of the application of interest that has been used previously.

When the application data 90 corresponding to the application ID remains in the previously-used storage resource (last used resource) and the storage resource is available, the management server 10 may directly allocate the storage resource. Further, when the application data 90 corresponding to the application ID does not remain in the previously-used storage resource but is backed up by software or archived in another storage resource, the management server 10 may secure a storage resource that satisfies the required amount of resource, and then migrate the application data 90 of the application of interest to the secured storage resource to start the application.

Figure 9:
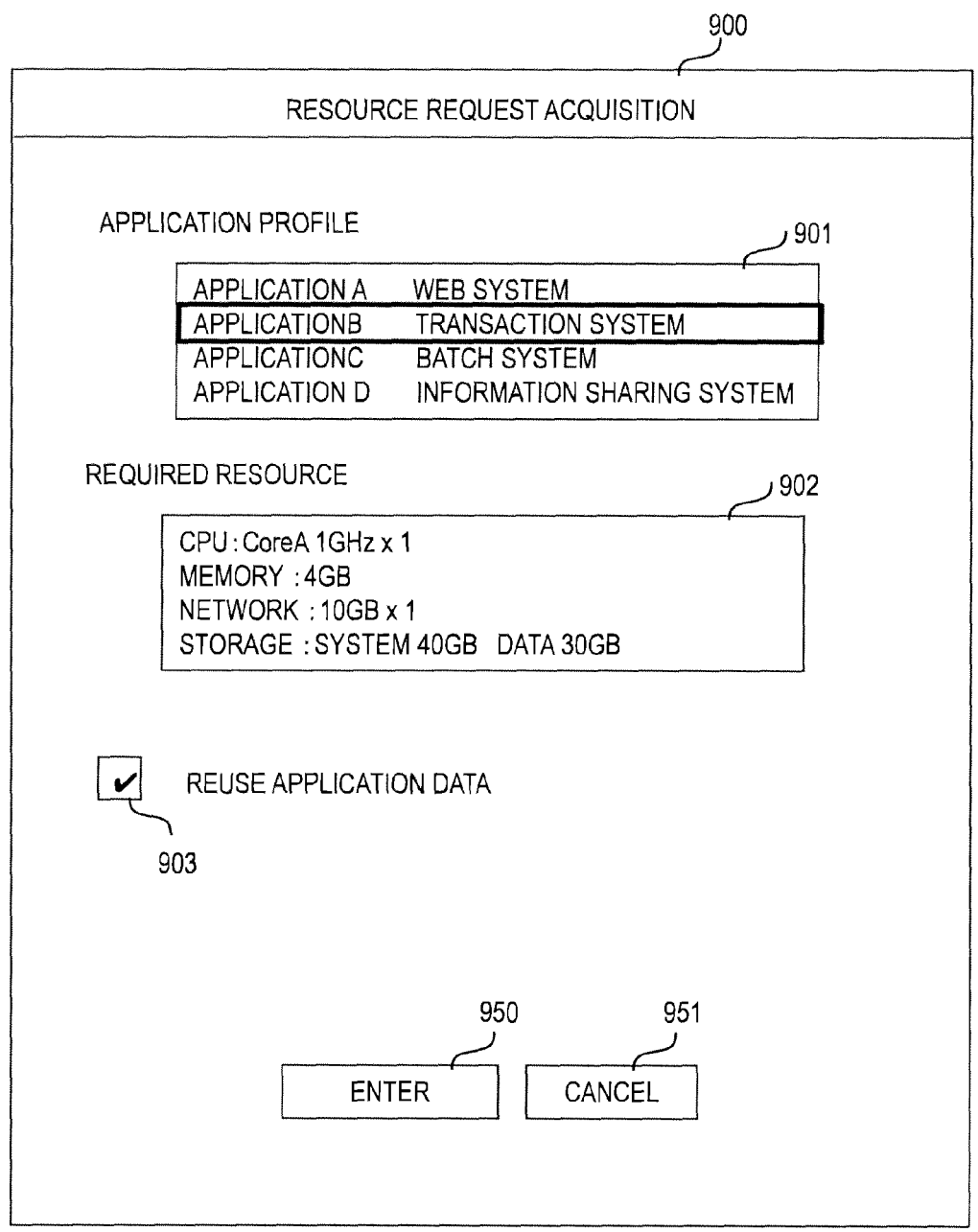
FIG. 9 illustrates an example of a user interface which is displayed on the output device.

FIG. 9 illustrates an example of a user interface (UI) which is displayed on the output device 16 and through which the resource management program 20 receives a request to allocate a resource. The UI is output by the allocation module 21 in Step 21-1 of the above-mentioned flow chart. The UI is displayed on the output device 16 coupled to the management server 10, a display device of another terminal coupled to the management server 10 via the management network 17, or the like by using a browser, a special program, text, and the like.

A window 900 indicates a window of the browser or the program. In a selection frame 901 of the application profile, the application profile to which the user wants to allocate a resource is selected through operation of the input device 15. In this example, the application ID and the application name of the application of interest are displayed.

In an input frame 902 for the required amount of resource, the required amount of resource in the resource request may be input. In this example, the CPU frequency and the number of CPUs, memory capacity, network performance and the number of networks, the storage capacity, and the like are input. It should be noted that in the storage capacity, a capacity of the system disk and a capacity of the data disk are input separately. Further, when the application profile includes the plurality of servers, the plurality of networks, and the plurality of storages, the amount of resource may be input for each of the servers, the networks, and the storages required in the input frame 902.

A check box 903 is used to specify whether or not to reuse the application data 90 of the application of interest. When an enter button 950 is clicked or executed, the application ID to be allocated the resources, the required amount of resource, and whether or not to reuse the application data 90 are transmitted to the resource management program 20. When a cancel button 951 is clicked or executed, the resource request is cancelled and ended.

Figure 10:
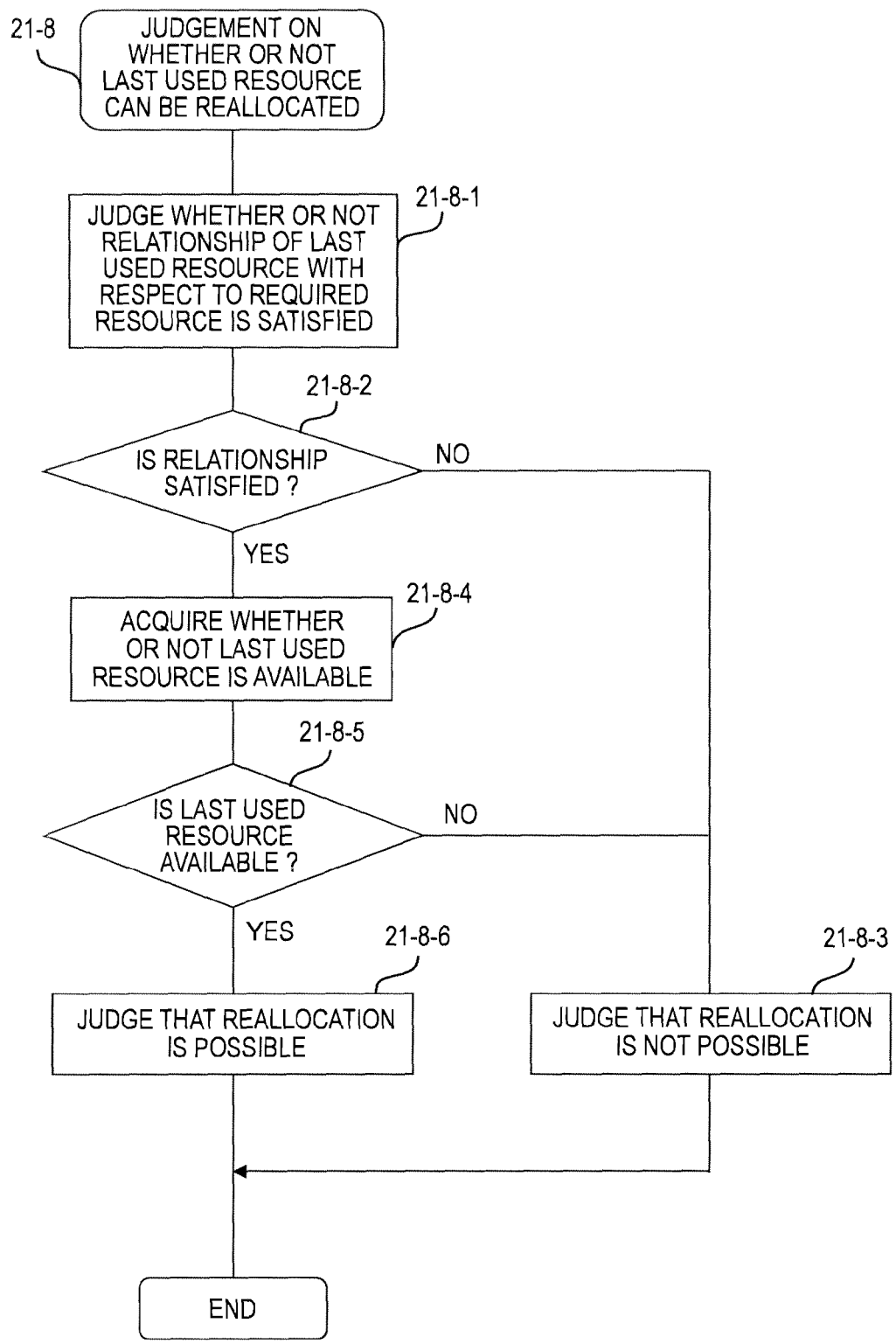
FIG. 10 is a detailed flow chart of the processing performed in Step 21-8 of the allocation module of FIG. 8.

By outputting the above-mentioned UI to the output device 16 or a display device of a computer (not shown), it is possible to select an application from the application profile, set the required amount of resource as desired, and transmit an instruction requesting allocation of a resource and an instruction to start an application to the management program 20 of the management server 10. FIG. 10 is a detailed flow chart of the processing performed in Step 21-8 of the allocation module 21 of FIG. 8.

In Step 21-8-1, the management server 10 judges whether or not the relationship of the amount of last used resource with respect to the required amount of resource is satisfied. In this example, the management server 10 refers to the column 315 of the application usage history DB 31, the server resource table 42, and the storage resource table 43 to determine an amount of resource of the server 60 and the storage 80 of the last used resources as the amount of last used resource, and compares the amount of resource of the server 60 and the storage 80 in the required amount of resource of the application of interest and the amount of last used resource to judge whether or not the following condition is satisfied:

(amount of last used resource)≥(required amount of resource)           (Condition 21-8-1).

In Step 21-8-2, the processing proceeds to Step 21-8-4 when the result of Step 21-8-1 is that the above-mentioned condition 21-8-1 is satisfied, or proceeds to Step 21-8-3 otherwise.

In Step 21-8-3, the management server 10 judges that the reallocation of the last used resources is not possible.

In Step 21-8-4, the management server 10 refers to the server resource table 42 and the storage resource table 43 for the use status of the last used resources to judge whether or not there is an available resource that is unused or satisfies the required amount of resource.

In Step 21-8-5, the processing proceeds to Step 21-8-6 when the management server 10 judges as the result of Step 21-8-4 that there is an available resource that satisfies the amount of last used resource or the required amount of resource, or proceeds to Step 21-8-3 otherwise. In Step 21-8-6, the management server 10 judges that the reallocation of the last used resource is possible.

Through the above-mentioned processing, the management server 10 compares the amount of last used resource and the required amount of resource to judge whether or not the reallocation of the last used resource is possible from the unused or available resource.

Figure 11:
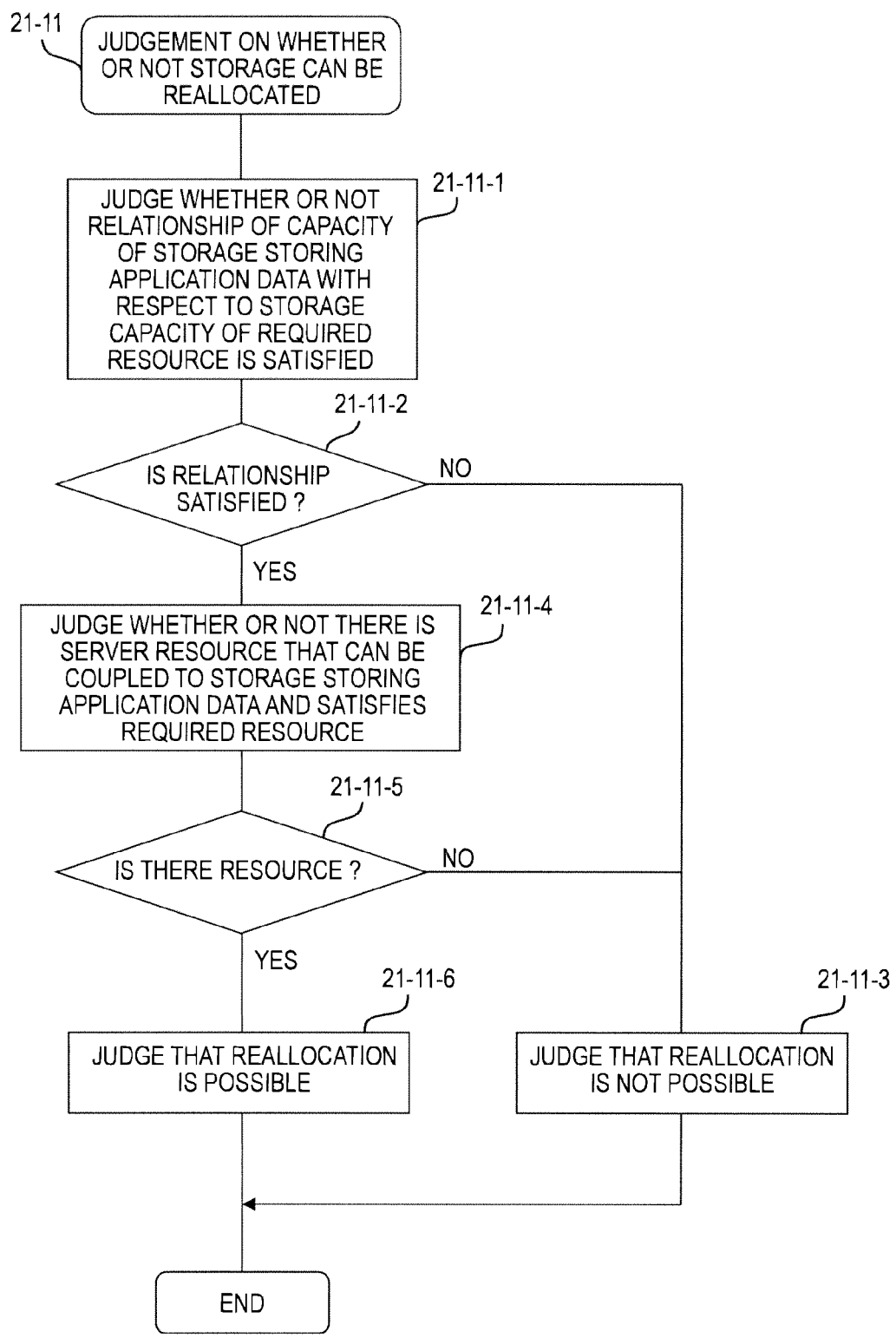
FIG. 11 is a detailed flow chart of the reallocation judgment processing performed in Step 21-11 of the allocation module of FIG. 8.

FIG. 11 is a detailed flow chart of the reallocation judgment processing performed in Step 21-11 of the allocation module 21 of FIG. 8.

In Step 21-11-1, the management server 10 judges whether or not there is a storage that satisfies the capacity for storing the application data 90 with respect to the capacity of the storage resource contained in the required amount of resource. In this case, the management server 10 refers to the stored storage 413 of the application data table 41 to acquire the logical unit of the storage resource in which the application data 90 of the application of interest is stored, refers to the logical unit information 432 of the storage resource table 43 to acquire the capacity of the logical unit in which the application data 90 is stored, and compares the capacity of the logical unit and the storage capacity contained in the required amount of resource of the application of interest to judge whether or not the following condition is satisfied:

(capacity of logical unit in which the application data is stored)≥(storage capacity in required amount of resource)       (Condition 21-11-1).

In Step 21-11-2, the processing proceeds to Step 21-11-4 when the result of Step 21-11-1 is that the above-mentioned condition 21-11-1 is satisfied, or proceeds to Step 21-11-3 otherwise.

In Step 21-11-3, the management server 10 judges that the reallocation of the resource of the storage, in which the application data 90 of the application of interest is stored, is not possible.

In Step 21-11-4, the management server 10 judges, based on the amount of storage resource of the required amount of resource, whether or not there is an unused resource or an available resource that satisfies the required amount of resource in the server resource table 42 and there is a server resource that can be coupled to the storage 80 identified in Step 21-11-1 described above. It should be noted that the management server 10 refers to the connection destination 424 of the server resource table 42 to judge whether or not the server resource can be coupled to the storage 80 as the reallocation destination.

In Step 21-11-5, the processing proceeds to Step 21-11-6 when the result of Step 21-11-4 is that there is a resource that satisfies the amount of last used resource or the required amount of resource, or proceeds to Step 21-11-3 otherwise. In Step 21-11-6, the management server 10 judges that the reallocation of the resource of the storage, in which the application data 90 of the application of interest is stored, is possible.

Figure 12:
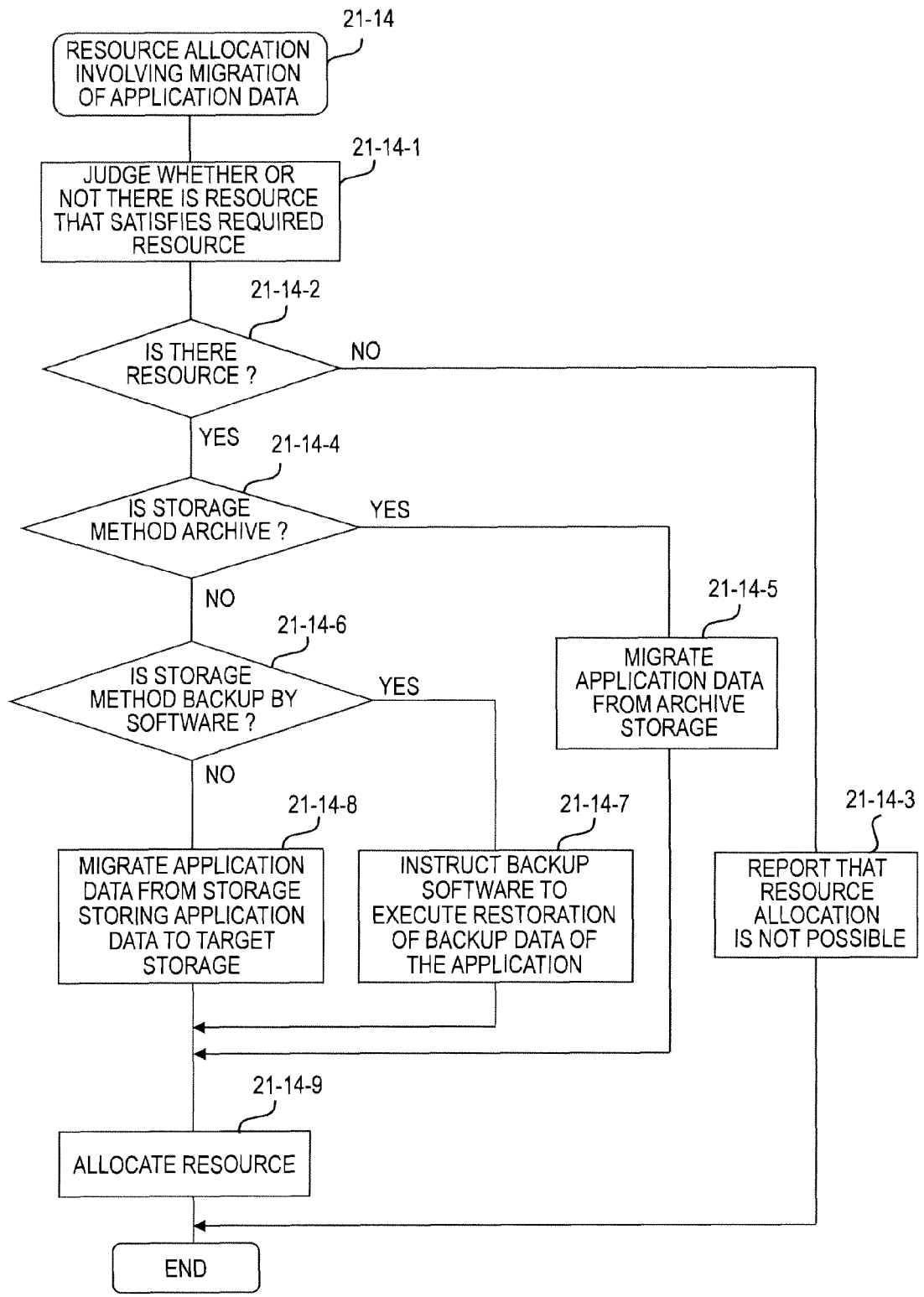
FIG. 12 is a detailed flow chart of the resource allocation processing performed in Step 21-14 of the allocation module of FIG. 8.

FIG. 12 is a detailed flow chart of the resource allocation processing performed in Step 21-14 of the allocation module 21 of FIG. 8.

In Step 21-14-1, the management server 10 judges, based on the storage capacity of the data disk of the required amount of resource and from the available capacity (column 433) in the storage resource table 43, whether or not there is a storage resource having an available resource that satisfies the storage resource capacity of the data disk of the required amount of resource.

In Step 21-14-2, the processing proceeds to Step 21-14-4 when the result of Step 21-14-1 is that there is a storage resource that satisfies the required amount of resource, or proceeds to Step 21-14-3 otherwise. It should be noted that when there is a storage resource that satisfies the required amount of resource, the management server 10 identifies a storage resource as the reallocation destination from the storages 80 of the storage resource table 43.

In Step 21-14-3, the management server 10 displays a message indicating a resource shortage on the output device 16 or the computer (not shown).

In Step 21-14-4, the processing proceeds to Step 21-14-5 when the management server 10 judges that the storage method of the application data 90 of the application of interest is archive, or proceeds to Step 21-14-6 otherwise.

In Step 21-14-5, the management server 10 migrates the application data 90 in the archive storage to the storage resource identified in Step 21-14-1. In this case, the migration is performed by using a function of migrating data from a tape or other such low-end archive storage to high-performance active storage (storage 80), such as a data lifecycle management function included in the storage 80 or a control product thereof.

In Step 21-14-6, the processing proceeds to Step 21-14-7 when the storage method of the application data 90 is backup by software, or proceeds to Step 21-14-8 otherwise.

In Step 21-14-7, the management server 10 uses a backup data restore function included in application middleware or the like used by the application of interest on the application data 90 of the application of interest. The "application middleware" as used herein means, for example, database software or an application server program.

In Step 21-14-8, the management server 10 migrates the application data 90 from the storage in which the application data 90 is stored to the storage resource identified in Step 21-14-1, by using a function of copying data between storage systems included in the storage 80.

In Step 21-14-9, the management server 10 refers to the server resource table 42 based on the storage resource identified in Step 21-14-1 and the required amount of resource for the application of interest to determine a server that satisfies the required amount of resource in the resource 50 as the allocated resource for the application of interest, and provisions the application of interest. Then, the management server 10 increments the "number of uses" of the column 312 of the application usage history DB 31 by (+1), adds the server resource to the column 313, and sets a flag indicating that the server resource is currently used in the column 315.

Through the above-mentioned processing, the storage 80, the server 60, and the network 70 that satisfy the required amount of resource are determined, and the application data 90 of the specified application ID is migrated from the archive destination or backup destination to the storage 80 as the allocation destination to start the application.

Figure 13:
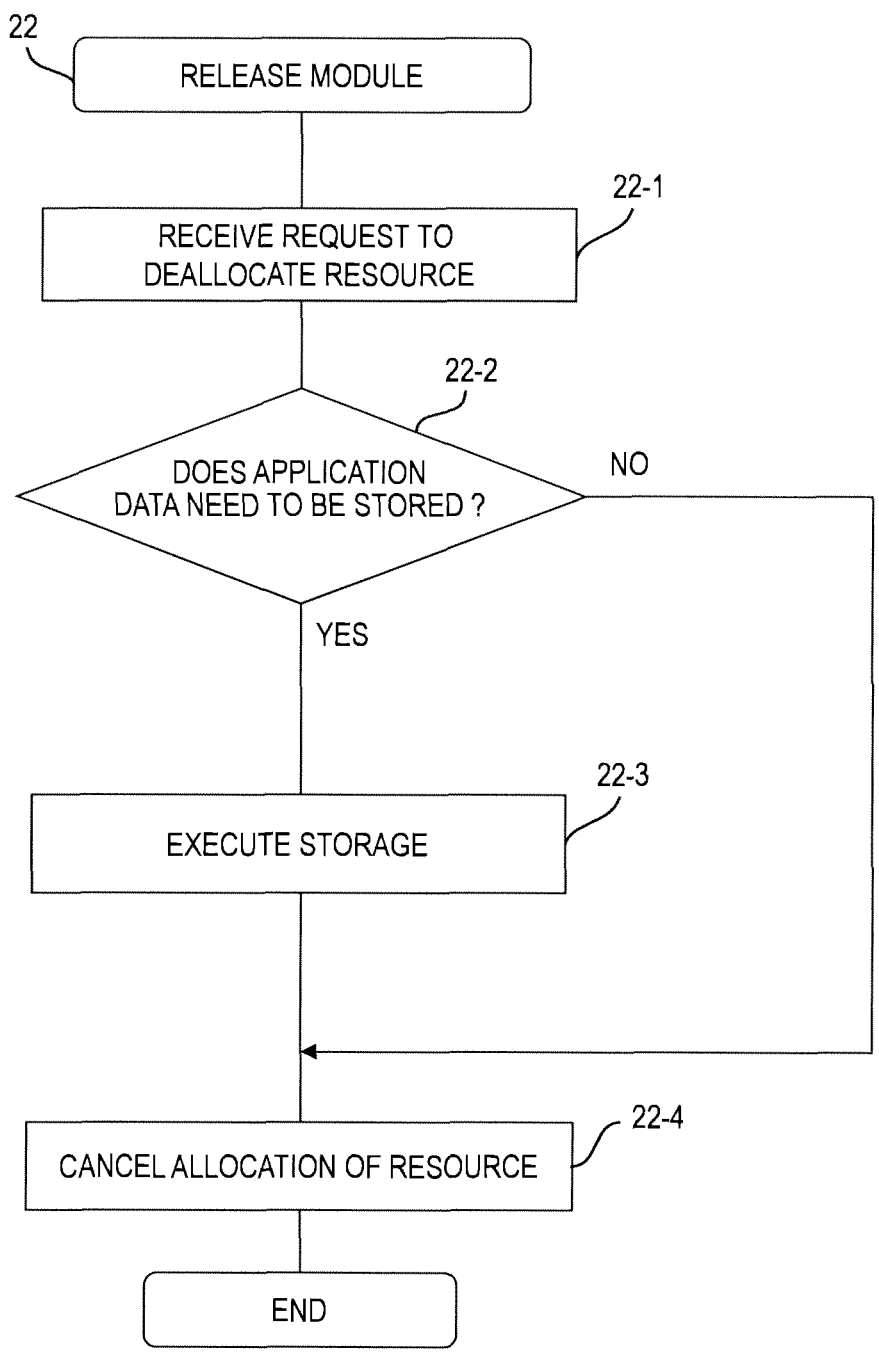
FIG. 13 is a detailed flow chart performed by the release module.

FIG. 13 is a detailed flow chart performed by the release module 22 of the resource management program 20. It should be noted that the release module 22 is invoked when the user wants to release a resource from an application by means of an instruction from the input device 15 or a computer (not shown).

In Step 22-1, the management server 10 receives from the user a request to release a resource. In this case, the management server 10 receives the application ID to be released, whether or not the application data 90 is to be stored, and the storage method (type of storage) when the application data 90 is to be stored. The storage method of the application data 90 may be selected from any one of maintaining the application data 90 to be reused in the storage 80, backing up the application data 90 by software, or archiving the application data 90.

In Step 22-2, the processing proceeds to Step 22-3 when the application data 90 needs to be stored, or proceeds to Step 22-4 otherwise.

In Step 22-3, the management server 10 stores the application data 90 in accordance with the storage method of the application data 90 specified in Step 22-1. If the storage method is to store in a storage, the management server 10 stores on the memory 11 a "store" flag of the logical unit of the storage 80 in which the application data 90 is stored. In other words, the management server 10 sets "stored" in the column 412 of the application data table 41 that corresponds to the application ID.

When the storage method is to store in archive, the management server 10 calls the data lifecycle management function included in the storage 80 or the control product thereof, and stores the application data 90 in the archive storage. When the storage method is backup by software, the management server 10 calls a backup function included in application middleware used by the application of interest and backs up the application data 90.

In Step 22-4, the management server 10 releases a resource from an application. The release involves deactivation of an instance (application program) of the application of interest on the resource 50 and deactivation of the server, deactivation and deletion of the virtual server when the virtual server is used, prohibiting access from the server 60 used by the application of interest to the storage 80 in which the system disk and data disk are stored, and deleting the contents of the system disk and data disk. It should be noted, however, that the deletion of the contents of the data disk is not performed when the "store" flag is set in Step 22-3. Further, the management server 10 deletes the "in-use" flag of the last allocated resource of the application usage history DB 31 of the application of interest, and updates whether the application data is stored or not (column 412), the stored storage (column 413), and the user allowed to access (column 414) of the application data table 41 based on the information received in Step 22-1.

Further, the management server 10 changes the use status (column 423) of the released server resource in the server resource table 42 to "unused", or updates the available amount of resource in the case of the virtualized environment.

The unallocated capacity (column 433) of the storage resource table 43 is updated based on the released storage resource. As an example, when the application data 90 is stored in a storage, the unallocated capacity is not changed.

Through the above-mentioned processing, when a resource 50 is to be released from the application of interest, the application data 90 is stored in the storage 80, the archive storage, or the backup destination by the user-selected method as described below, and the application usage history DB 31 is updated with the history of the allocated resource 50. Further, the storage status of the application data 90 after use is stored in the application data table 41 to be reused in the next application.

Figure 14:
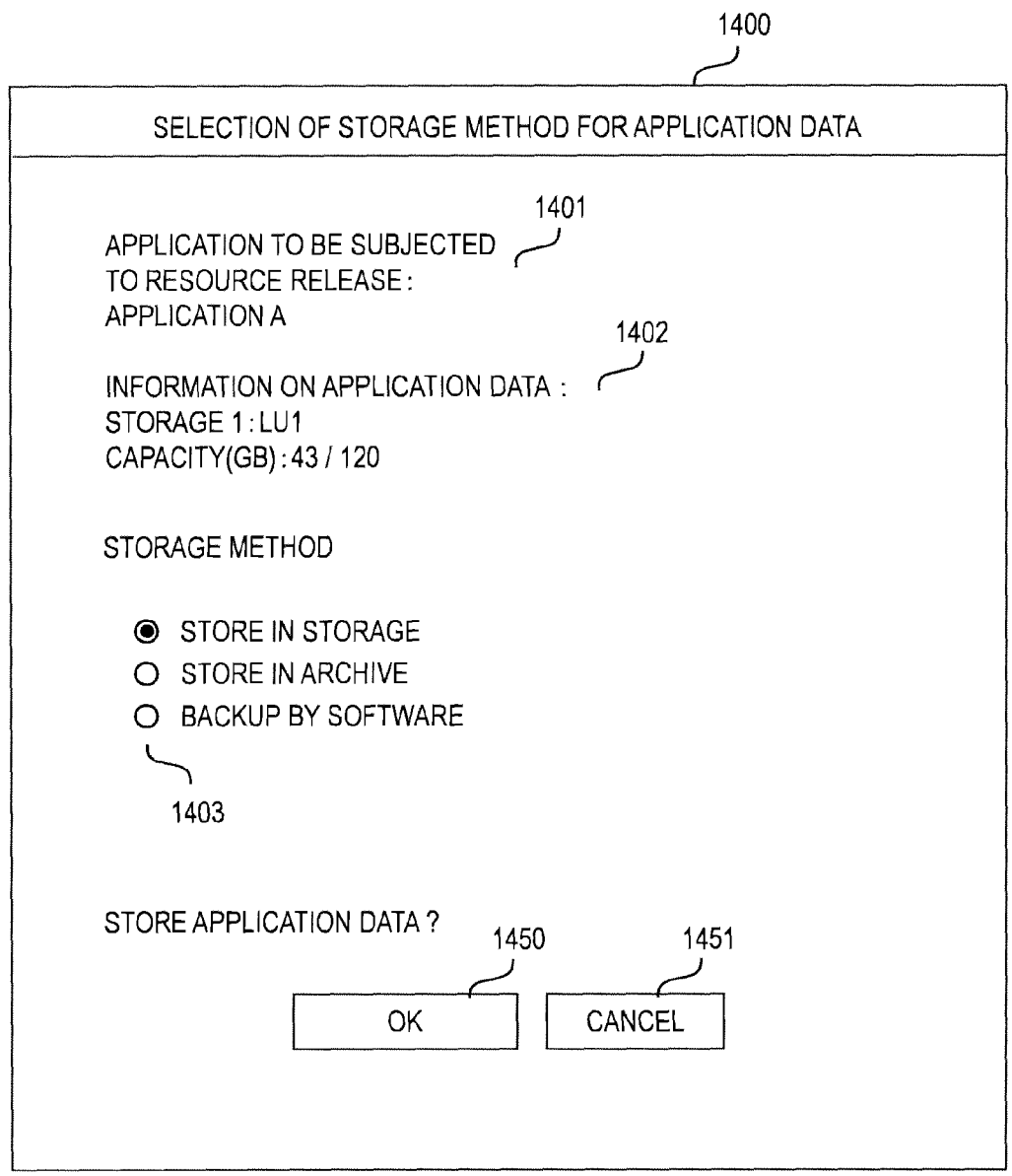
FIG. 14 is an example of a user interface for storing the application data to be displayed on the output device.

FIG. 14 is an example of a UI for storing the application data to be displayed by the resource management program 20 on the output device 16. The UI is used in Step 21-1 of the flow chart of the release module 22. The UI is displayed on the output device 16 coupled to the management server 10 or a display device of another terminal coupled to the management server 10 via a network by using a browser, a special program, text, and the like.

A window 1400 indicates a window of the browser or the program. Information displayed on the window 1400 includes information 1401 on an application to be subjected to resource release, which is an application ID. Also displayed is information 1402 on the application data 90, which is information on the storage 80 and the logical unit in which the application data 90 is stored, and capacity (consumed capacity and allocated capacity). The storage method is specified with radio buttons (1403). When the application data 90 is to be stored, an "OK" button 1450 is clicked or executed, which transmits the application ID, whether the application data is stored or not, and the storage method to the resource management program 20. When a "Cancel" button 1451 is clicked or executed, the application data 90 is not stored.

As described above, according to this invention, the history of the resources most recently used by the application ID, whether the application data is stored or not, and the location of the application data are held in association with the application ID. When the resources are to be reallocated to the application ID, the required amount of resource and the application ID are received to determine the resource 50 which satisfies the required amount of resource and can be coupled to the application data based on the latest resource allocation history, whether the application data is stored or not, the location of the application data, and the resource availability, and the application data and the system disk images 301 are allocated to the determined resource 50 to resume the application.

Therefore, the user who administers the application no longer needs to perform the task of backing up or restoring the application data when the resource is to be released or the application is to be resumed, and the trouble in operating the resource pool may be significantly reduced.

As described above, this invention is applicable to the computer system that executes an application by using a resource pool, the management server that manages resources in the resource pool, and the program of the management server.

What is claimed is:

1. A computer system, comprising:
   a computer resource including one or more servers and a storage coupled to the one or more servers, for providing an application; and
   a management server including a processor and a memory, configured to manage the computer resource, the management server comprising:

application information holding an identifier of the application, a system image corresponding to the identifier of the application, a number of uses of the application, a server used by the application, the storage used by the application, whether application data used in the application is stored, and a location of the storage in which the application data is stored;

resource information holding performance information of the one or more servers and the storage constituting the computer resource, a use status, and a connection relationship; and a resource management program, wherein the resource management program includes a subprogram of a release module for releasing the computer resource allocated to the application, wherein by executing the resource management program, the management server is configured to:

receive an resource allocation request comprising the identifier of the application and a required amount of resource including an amount of resource to be allocated to the application, refer to the application information to identify the application and the system image corresponding to the identifier, acquire the number of uses of the application and whether the application data is stored, and judge whether a use of application is a first time or reuse from the number of uses;

when the use of the application is the first time or when the application data is not stored, determine a server and a storage to be allocated to the application based on the required amount of resource and the resource information;

receive, by invoking the release module, the identifier of the application from which the computer resource is to be released, whether to store application data used by the application, and the type of storing of application data when the application data is to be stored, and release the computer resource after storing the application data to the storage in accordance with the type of storing when the application data is to be stored; and when the use of the application is reuse and when the application data is stored, acquire the location of the storage in which the application data is stored from the application information, determine a combination of a server and a storage which satisfies the required amount of resource and is accessible to the application data by referring to the resource information, wherein when the application data is stored as backup data, instead determine a combination of the different storage satisfying the required amount of resource for a server and a storage which satisfies the required amount of resource and is accessible to the storage different from the storage storing the application data by referring to the resource information, and allocate the system image to the determined server.

2. The computer system according to claim 1, wherein the resource management program is configured to, when the use of the application is reuse and when the application data is stored, acquire from the application information the location of the storage in which the application data is stored, and determine the combination of the server and the storage which satisfy the required amount of resource and are accessible to the application data by referring to the resource information and the application information from combinations of servers and storages previously used by the application.

3. The computer system according to claim 1, wherein the resource management program is configured to, when the use of the application is reuse and when the application data is stored, acquire from the application information the location of the storage in which the application data is stored, and determine the combination of the server and the storage which satisfy the required amount of resource and are accessible to the application data by referring to the resource information and the application information from combinations of storages previously used by the application and servers which are able to couple to the storages and include a resource that satisfies the required amount of resource.

4. The computer system according to claim 1, wherein the resource management program is configured to:

migrate the application data to a storage that is different from the storage in which the application data is stored; and when the use of the application is reuse and when the application data is stored, acquire from the application information the location of the storage in which the application data is stored, and determine the combination of the server and the storage which satisfy the required amount of resource and are accessible to the application data by referring to the resource information and the application information, from combinations of the different storage that satisfies a resource of the storage in the required amount of resource and servers which satisfy the required amount of resource and are accessible to the storage to which the application data is migrated.

5. The computer system according to claim 4, wherein the resource management program is configured to, when the application data is migrated to the storage that is different from the storage in which the application data is stored, copy the application data between the storages.

6. The computer system according to claim 4, wherein the resource management program is configured to, when the application data is migrated to the storage that is different from the storage in which the application data is stored, restore the application data to the storage from backup data of the application data.

7. The computer system according to claim 1, wherein the resource management program further comprises a release module for releasing the computer resource from the application, and wherein the release module is configured to:

receive an identifier of the application from which the computer resource is to be released, whether the application data used in the application is stored or not, and a type of storage of the application data when the application data is to be stored; and release the computer resource after storing the application data based on whether the application data is stored or not and the type of storage, which are received.

8. The computer system according to claim 1, wherein the application information holds, in association with the application data, one or more user identifiers allowed to access the application data, and wherein the resource management program is configured to:

acquire the identifier of the application and an identifier of a user who requested the computer resource including the required amount of resource from the application information; and when the identifier of the user who requested the computer resource is identical with any one of the one or more user identifiers allowed to access the application data, determine the combination of the server and the storage which are accessible to the application data.

9. A method of managing a computer resource, which is used in a computer system comprising the computer resource including one or more servers and a storage coupled to the one or more servers, for providing an application, and a management server including a processor and a memory, for managing the computer resource, and in which the management server allocates the computer resource to the application, the management server holding:

application information containing an identifier of the application, a system image corresponding to the identifier of the application, a number of uses of the application, a server used by the application, the storage used by the application, and in association with the identifier of the application, whether application data which is used in the application is stored, and a location of the storage in which the application data is stored; and resource information containing performance information of the one or more servers and the storage constituting the computer resource, a use status, and a connection relationship, the method of managing a computer resource comprising:

a first step of receiving, by the management server, a resource allocation request comprising the identifier of the application, and a required amount of resource including an amount of resource to be allocated to the application;

a second step of referring, by the management server, to the application information to identify the application and the system image corresponding to the identifier, acquiring the number of uses of the application and whether the application data is stored, and judging whether a use of the application is a first time or reuse from the number of uses;

a third step of determining, by the management server, when the use of the application is the first time or the application data is not stored, a server and the storage to be allocated to the application from the required amount of resource and the resource information;

a fourth step of receiving, by invoking a release module, the identifier of the application from which the computer resource is to be released, whether to store the application data used by the application, and the type of storing the application when the application data is to be stored, and releasing the computer resource after storing the application data to the storage in accordance with the type of storing when the application data is to be stored, wherein the release module is configured to release computer resource allocated to an application;

a fifth step of acquiring, by the management server, when the use of the application is reuse and the application data is stored, the location of the storage in which the application data is stored from the application information, and determining a combination of a server and a storage which satisfies the required amount of resource and is accessible to the application data by referring to the resource information, wherein when the application data is stored as backup data, instead determining a combination of the different storage satisfying the required amount of resource for a server and a storage which satisfies the required amount of resource and is accessible to the storage different from the storage storing the application data by referring to the resource information; and a sixth step of allocating, by the management server, the system image to the determined server.

10. The method of managing a computer resource according to claim 9, wherein the fifth step comprises determining the combination of the server and the storage which satisfy the required amount of resource and are accessible to the application data by referring to the resource information and the application information from combinations of servers and storages previously used by the application.

11. The method of managing a computer resource according to claim 9, wherein the fifth step comprises determining the combination of the server and the storage which satisfy the required amount of resource and are accessible to the application data by referring to the resource information and the application information from combinations of storages previously used by the application and servers which are able to couple to the storages and include a resource that satisfies the required amount of resource.

12. The method of managing a computer resource according to claim 9, wherein the third step comprises migrating the application data to a storage that is different from the storage in which the application data is stored, and wherein the fifth step comprises determining from combinations of the different storage that satisfies a resource of the storage in the required amount of resource and servers which satisfy the required amount of resource and are accessible to the storage to which the application data is migrated.

13. The method of managing a computer resource according to claim 12, wherein the migrating of the application data to the storage that is different from the storage in which the application data is stored comprises copying the application data between the storages.

14. The method of managing a computer resource according to claim 12, wherein the migrating of the application data to the storage that is different from the storage in which the application data is stored comprises:

restoring the application data to the storage from backup data of the application data.

15. The method of managing a computer resource according to claim 9, further comprising releasing the computer resource from the application, wherein the releasing of the computer resource from the application comprises:

receiving an identifier of the application from which the computer resource is to be released, whether the application data used in the application is stored or not, and a type of storage of the application data when the application data is to be stored; and releasing the computer resource after storing the application data based on whether the application data is stored or not and the type of storage, which are received.

16. The method of managing a computer resource according to claim 9, wherein the application information holds, in association with the application data, one or more user identifiers allowed to access the application data, wherein the first step comprises acquiring the identifier of the application and an identifier of a user who requested the computer resource including the required amount of resource from the application information, and wherein the fifth step comprises, when the identifier of the user who requested the computer resource is identical with any one of the one or more user identifiers allowed to access the application data, determining the combination of the server and the storage which are accessible to the application data.

17. A computer-readable non-transitory data storage medium, containing a program for controlling a computer resource including one or more servers and a storage coupled to the one or more servers, for providing an application, and a management server including a processor and a memory, for managing the computer resource, the program controlling the management server to execute the procedures of:

storing in the memory:

application information holding an identifier of the application, a system image corresponding to the identifier of the application, a number of uses of the application, a server used by the application, the storage used by the application, whether the application data used in the application is stored, and a location of the storage in which the application data is stored; and resource information holding performance information of the one or more servers and the storage constituting the computer resource, a use status, and a connection relationship;

receiving a resource allocation request comprising the identifier of the application, and a required amount of resource including an amount of resource to be allocated to the application;

referring to the application information to identify the application and the system image corresponding to the identifier, acquiring the number of uses of the application and whether the application data is stored, and judging whether a use of the application is a first time or reuse from the number of uses;

when the use of the application is the first time or the application data is not stored, determining a server and the storage to be allocated to the application from the required amount of resource and the resource information;

receiving the identifier of the application from which the computer resource is to be released, whether to store application data used by the application, and the type of storing the application data when the application data is to be stored, and releasing the computer resource after storing the application data to the storage in accordance with the type of storing when the application data is to be stored;

when the use of the application is reuse and the application data is stored, acquiring the location of the storage in which the application data is stored from the application information, and determining a combination of a server and a storage which satisfies the required amount of resource and is accessible to the application data by referring to the resource information, wherein when the application data is stored as backup data, instead determining a combination of the different storage satisfying the required amount of resource for a server and a storage which satisfies the required amount of resource and is accessible to the storage different from the storage storing the application data by referring to the resource information; and allocating the system image to the determined server.

* * * * *